(12) United States Patent
Hassan et al.

(10) Patent No.: US 8,133,925 B2
(45) Date of Patent: Mar. 13, 2012

(54) SYSTEM AND PROCESS FOR FISCHER-TROPSCH CONVERSION

(75) Inventors: Abbas Hassan, Sugar Land, TX (US); Ebrahim Bagherzadeh, Sugar Land, TX (US); Rayford G. Anthony, College Station, TX (US); Gregory Borsinger, Chatham, NJ (US); Aziz Hassan, Sugar Land, TX (US)

(73) Assignee: H R D Corporation, Houston, TX (US)

( * ) Notice: Subject to any disclaimer, the term of this patent is extended or adjusted under 35 U.S.C. 154(b) by 772 days.

(21) Appl. No.: 12/138,269

(22) Filed: Jun. 12, 2008

(65) Prior Publication Data

US 2009/0003126 A1    Jan. 1, 2009

Related U.S. Application Data

(60) Provisional application No. 60/946,468, filed on Jun. 27, 2007.

(51) Int. Cl.
*C07C 27/00* (2006.01)
(52) U.S. Cl. ......... 518/700; 518/702; 518/705; 518/715
(58) Field of Classification Search .................. 518/700, 518/702, 5, 715
See application file for complete search history.

(56) References Cited

U.S. PATENT DOCUMENTS

| | | | |
|---|---|---|---|
| 5,844,005 A | 12/1998 | Bauman et al. | |
| 5,877,350 A | 3/1999 | Langer et al. | |
| 6,096,789 A | 8/2000 | Clerici et al. | |
| 6,147,126 A | 11/2000 | DeGeorge et al. | |
| 6,262,131 B1 | 7/2001 | Arcuri et al. | |
| 6,368,366 B1 | 4/2002 | Langer et al. | |
| 6,368,367 B1 | 4/2002 | Langer et al. | |
| 6,383,237 B1 | 5/2002 | Langer et al. | |
| 6,600,000 B1 | 7/2003 | Ooura et al. | |
| 6,822,007 B2 | 11/2004 | Ketley et al. | |
| 7,556,679 B2 | 7/2009 | Lee et al. | |
| 2003/0043690 A1 | 3/2003 | Holl | |
| 2004/0052158 A1 | 3/2004 | Holl | |
| 2004/0147621 A1* | 7/2004 | Font-Freide et al. | 518/726 |
| 2004/0180976 A1* | 9/2004 | Hensman et al. | 518/726 |
| 2005/0033069 A1 | 2/2005 | Holl et al. | |

FOREIGN PATENT DOCUMENTS

JP   3-197504 A   8/1991
WO   02-096836   12/2002

OTHER PUBLICATIONS

Chinese Office Action, Application No. 200880020903.9, dated Mar. 15, 2011 (4 pgs.) (5 pgs English translation).
Canadian Office Action, Application No. 2,679,470, dated Mar. 25, 2011 (3 pgs.).
European Search Report, International Application No. 08771780.7, dated Apr. 12, 2011 (5 pgs.).

* cited by examiner

*Primary Examiner* — Jafar Parsa
(74) *Attorney, Agent, or Firm* — Timothy S. Westby; Porter Hedges LLP (57) ABSTRACT

A method for forming C2+ hydrocarbons by forming a dispersion comprising synthesis gas bubbles dispersed in a liquid phase comprising hydrocarbons in a high shear device, wherein the average bubble diameter of the synthesis gas bubbles is less than about 1.5 μm, introducing the dispersion into a reactor, and removing a product stream comprising C2+ hydrocarbons from the reactor. A system for converting carbon monoxide and hydrogen gas into C2+ hydrocarbons including at least one high shear mixing device comprising at least one rotor and at least one stator separated by a shear gap, wherein the high shear mixing device is capable of producing a tip speed of the at least one rotor of greater than 22.9 m/s (4,500 ft/min), and a pump configured for delivering a fluid stream comprising liquid medium to the high shear mixing device.

18 Claims, 3 Drawing Sheets

SYSTEM AND PROCESS FOR FISCHER-TROPSCH CONVERSION

CROSS-REFERENCE TO RELATED APPLICATIONS

This application claims the benefit under 35 U.S.C. §119(e) of U.S. Provisional Patent Application No. 60/946,468 entitled "High Shear Fischer-Tropsch Process," filed Jun. 27, 2007 the disclosure of which is hereby incorporated herein by reference.

STATEMENT REGARDING FEDERALLY SPONSORED RESEARCH OR DEVELOPMENT

Not Applicable.

BACKGROUND OF THE INVENTION

1. Technical Field

The present invention generally relates to Fischer-Tropsch conversion of carbon monoxide and hydrogen to hydrocarbons having two or more carbon atoms (C2+ hydrocarbons). More particularly, the present invention relates to a high shear process for improving Fischer-Tropsch conversion of synthesis gas (i.e., a mixture of carbon monoxide and hydrogen) into hydrocarbons.

2. Background of the Invention

The Fischer-Tropsch process is utilized for the conversion of carbonaceous feedstock, e.g., coal or natural gas, to higher value liquid fuel or petrochemicals. Large quantities of methane, the main component of natural gas, are available in many areas of the world. Methane may be reformed with water or partially oxidized with oxygen to produce carbon monoxide and hydrogen (i.e., syngas or synthesis gas). Coal and other solid materials may also be used as starting raw materials from which synthesis gas may be produced.

Preparation of Hydrocarbons from Synthesis Gas is Well Known in the Art and is Usually referred to as Fischer-Tropsch synthesis, the Fischer-Tropsch process, or Fischer-Tropsch reaction(s). Catalysts for use in such synthesis usually contain a catalytically active metal of Groups 8, 9, 10 (in the new notation for the periodic table of the elements). In particular, iron, cobalt, nickel, and ruthenium may be used as the catalytically active metal. Cobalt and ruthenium have been found to be especially suitable for catalyzing a process in which synthesis gas is converted to primarily hydrocarbons having five or more carbon atoms (i.e., where the $C_5^+$ selectivity of the catalyst is high). A Fischer-Tropsch catalyst may also be promoted with other metals.

Catalytic hydrogenation of carbon monoxide by Fischer-Tropsch may produce a variety of products ranging from methane to higher alkanes and aliphatic alcohols. Fischer-Tropsch synthesis reactions are very exothermic and reaction vessels must be designed for adequate heat exchange capacity. Because the reactants for Fischer-Tropsch are gases while the product streams include liquids and waxes, the system is typically designed to continuously produce and remove therefrom a desired range of liquid and wax hydrocarbon products.

Research continues on developing more efficient Fischer-Tropsch catalyst systems and reaction systems that increase the selectivity for higher-value hydrocarbons in the Fischer-Tropsch product stream. In particular, a number of studies describe the behavior of iron, cobalt or ruthenium based catalysts in various reactor types, together with the development of catalyst compositions and preparations.

There are significant differences in the molecular weight distributions of the hydrocarbon products from Fischer-Tropsch reaction systems. Product distribution and/or product selectivity depends on the type and structure of the catalysts and on the reactor type and operating conditions. In general, however, the Fischer-Tropsch process yields an abundance of higher molecular weight wax-like compounds. Lower temperature Fischer-Tropsch operation generally produces heavier hydrocarbon products. In conventional Fischer-Tropsch processes, the higher molecular weight materials are subsequently cracked to lower molecular weight liquids for use as fuels and chemical feedstocks. Therefore, it is desirable to maximize the selectivity of the Fischer-Tropsch synthesis to the production of high-value liquid hydrocarbons, for example hydrocarbons with five or more carbon atoms per hydrocarbon chain.

Accordingly, there is a need in industry for improving production of liquid and gaseous hydrocarbons via catalytic Fischer-Tropsch conversion of synthesis gas.

SUMMARY

High shear systems and methods for Fischer Tropsch conversion of synthesis gas to liquid and gaseous hydrocarbons are disclosed. In accordance with certain embodiments, a method for forming C2+ hydrocarbons, the method comprising forming a dispersion comprising synthesis gas bubbles dispersed in a liquid phase comprising hydrocarbons in a high shear device, wherein the average bubble diameter of the synthesis gas bubbles is less than about 1.5 μm, introducing the dispersion into a reactor, and removing a product stream comprising liquid hydrocarbons from the reactor. The gas bubbles may have a mean diameter of less than 400 nm. The gas bubbles may have a mean diameter of no more than 100 nm. The synthesis gas may be generated via natural gas reforming. The synthesis gas may be generated via solids gasification. In embodiments, the solid is selected from the group consisting of coal, biomass, and bio-renewables. The reactor may comprise Fischer-Tropsch catalyst and the method may further comprise circulating at least a portion of the product stream to the high shear device. The portion of the product stream circulated to the high shear device may comprise Fischer-Tropsch catalyst. The portion of the product stream circulated to the high shear device may be substantially catalyst-free.

In some embodiments, forming the dispersion comprises subjecting a mixture of the synthesis gas and the liquid phase to a shear rate of greater than about 20,000 s$^{-1}$. The high shear device may comprise at least one rotor, wherein the at least one rotor is rotated at a tip speed of at least 22.9 m/s (4,500 ft/min) during formation of the dispersion. In embodiments, the high shear device produces a local pressure of at least about 1034.2 MPa (150,000 psi) at the tip of the at least one rotor. The energy expenditure of the high shear device may be greater than 1000 W/m$^3$. In embodiments of the method, the catalyst comprises a metal selected from the group consisting of iron, cobalt, and combinations thereof.

Also disclosed herein is a method for converting synthesis gas to C2+ hydrocarbons, the method comprising forming a fluid mixture comprising synthesis gas and a liquid comprising hydrocarbons, subjecting the fluid mixture to a shear rate greater than 20,000 s$^{-1}$ to produce a dispersion of carbon monoxide and hydrogen gas bubbles in a continuous phase of the liquid, and introducing the dispersion into a Fischer-Tropsch reactor from which a reactor product is removed. The method may further comprise removing a gas stream comprising unreacted synthesis gas from a top portion of the reactor, and forming additional dispersion with at least a portion of the unreacted synthesis gas. The average bubble diameter of the hydrogen and carbon monoxide gas bubbles in the dispersion may be less than about 5 μm. In embodiments, the dispersion is stable for at least about 15 minutes at atmospheric pressure. Subjecting the fluid mixture to a shear rate greater than 20,000 s$^{-1}$ may comprise introducing the fluid into a high shear device comprising at least two generators.

A system for converting carbon monoxide gas and hydrogen gas into C2+ hydrocarbons is disclosed herein, the system comprising at least one high shear mixing device comprising at least one rotor and at least one stator separated by a shear gap, wherein the shear gap is the minimum distance between the at least one rotor and the at least stator, and wherein the high shear mixing device is capable of producing a tip speed of the at least one rotor of greater than 22.9 m/s (4,500 ft/min), and a pump configured for delivering a fluid stream comprising liquid medium to the high shear mixing device. The system may further comprise a Fischer Tropsch reactor fluidly connected to an outlet of the external high shear device and having an outlet for a product stream comprising liquid hydrocarbons. The at least one high shear mixing device may be configured for producing a dispersion of hydrogen and carbon monoxide gas bubbles in a liquid phase, wherein the dispersion has a mean bubble diameter of less than 5 nm. In embodiments, the at least one high shear mixing device is capable of producing a tip speed of the at least one rotor of at least 20.3 m/s (4000 ft/min). The system may comprise at least two high shear mixing devices. The reactor may be a slurry reactor. In embodiments, the system further comprises a separator, the product stream further comprises catalyst, and the separator comprises an inlet connected to the outlet for the product stream and an outlet for a catalyst slurry stream from which at least a portion of the liquid hydrocarbons have been removed, and an outlet for a stream comprising liquid hydrocarbons. The method may further comprise a recycle line connecting the outlet for the catalyst slurry stream and an inlet to the Fischer-Tropsch reactor.

In a system for converting synthesis gas to C2+ hydrocarbons, including a Fischer Tropsch reactor and a Fischer-Tropsch catalyst that catalyzes the conversion of synthesis gas to hydrocarbons, an improvement is disclosed, the improvement comprising an external high shear device upstream of the reactor, the external high shear device comprising an inlet for a fluid stream comprising synthesis gas and a liquid medium, and at least one generator comprising a rotor and a stator having a shear gap therebetween, wherein the high shear device provides an energy expenditure of greater than 1000 W/m$^3$ of fluid. The high shear device may comprise at least two generators. In embodiments, the shear rate provided by one generator is greater than the shear rate provided by another generator.

In some embodiments, the system further comprises a pump configured for delivering a liquid medium and synthesis gas to the high shear mixing device. The system comprises a reactor configured for receiving a dispersion from the high shear device. Some embodiments of the system potentially make possible the conversion of synthesis gas into hydrocarbons without the need for large volume Fischer-Tropsch reactors, via the use of an external pressurized high shear reactor.

Certain embodiments of an above-described method or system potentially provide for more optimal time, temperature and pressure conditions than are otherwise possible, and which potentially increase the rate of the gas/liquid/solid phase process. Certain embodiments of the above-described methods or systems potentially provide overall cost reduction by operating at lower temperature and/or pressure, providing increased product per unit of catalyst utilized, decreased reaction time, and/or reduced capital and/or operating costs. These and other embodiments and potential advantages will be apparent in the following detailed description and drawings.

BRIEF DESCRIPTION OF THE DRAWINGS

For a more detailed description of the preferred embodiment of the present invention, reference will now be made to the accompanying drawings, wherein.

NOTATION AND NOMENCLATURE

As used herein, the term "dispersion" refers to a liquefied mixture that contains at least two distinguishable substances (or "phases") that will not readily mix and dissolve together. As used herein, a "dispersion" comprises a "continuous" phase (or "matrix"), which holds therein discontinuous droplets, bubbles, and/or particles of the other phase or substance. The term dispersion may thus refer to foams comprising gas bubbles suspended in a liquid continuous phase, emulsions in which droplets of a first liquid are dispersed throughout a continuous phase comprising a second liquid with which the first liquid is immiscible, and continuous liquid phases throughout which solid particles are distributed. As used herein, the term "dispersion" encompasses continuous liquid phases throughout which gas bubbles are distributed, continuous liquid phases throughout which solid particles (e.g., solid catalyst) are distributed, continuous phases of a first liquid throughout which droplets of a second liquid that is substantially insoluble in the continuous phase are distributed, and liquid phases throughout which any one or a combination of solid particles, immiscible liquid droplets, and gas bubbles are distributed. Hence, a dispersion can exist as a homogeneous mixture in some cases (e.g., liquid/liquid phase), or as a heterogeneous mixture (e.g., gas/liquid, solid/liquid, or gas/solid/liquid), depending on the nature of the materials selected for combination.

DETAILED DESCRIPTION

Overview

The rate of chemical reactions involving liquids, gases and solids depend on time of contact, temperature, and pressure. In cases where it is desirable to react two or more raw materials of different phases (e.g. solid and liquid; liquid and gas; solid, liquid and gas), one of the limiting factors controlling the rate of reaction involves the contact time of the reactants. In the case of heterogeneously catalyzed reactions there is the additional rate limiting factor of having the reacted products removed from the surface of the catalyst to permit the catalyst to catalyze further reactants. Contact time for the reactants and/or catalyst is often controlled by mixing which provides contact with two or more reactants involved in a chemical reaction.

A reactor assembly that comprises an external high shear device or mixer as described herein makes possible decreased mass transfer limitations and thereby allows the reaction to more closely approach kinetic limitations. When reaction rates are accelerated, residence times may be decreased, thereby increasing obtainable throughput. Product yield may be increased as a result of the high shear system and process. Alternatively, if the product yield of an existing process is acceptable, decreasing the required residence time by incorporation of suitable high shear may allow for the use of lower temperatures and/or pressures than conventional processes. Lower temperature Fischer-Tropsch conversion may be used to desirably produce heavier hydrocarbons.

Furthermore, without wishing to be limited by theory, it is believed that the high shear conditions provided by a reactor assembly that comprises an external high shear device or mixer as described herein may permit Fischer-Tropsch conversion of synthesis gas into liquid hydrocarbons generally having five or more carbon atoms (C5+ hydrocarbons) and gaseous hydrocarbons generally having two or more carbon atoms (C2+ hydrocarbons) at global operating conditions under which reaction may not conventionally be expected to occur to any significant extent.

Figure 1:
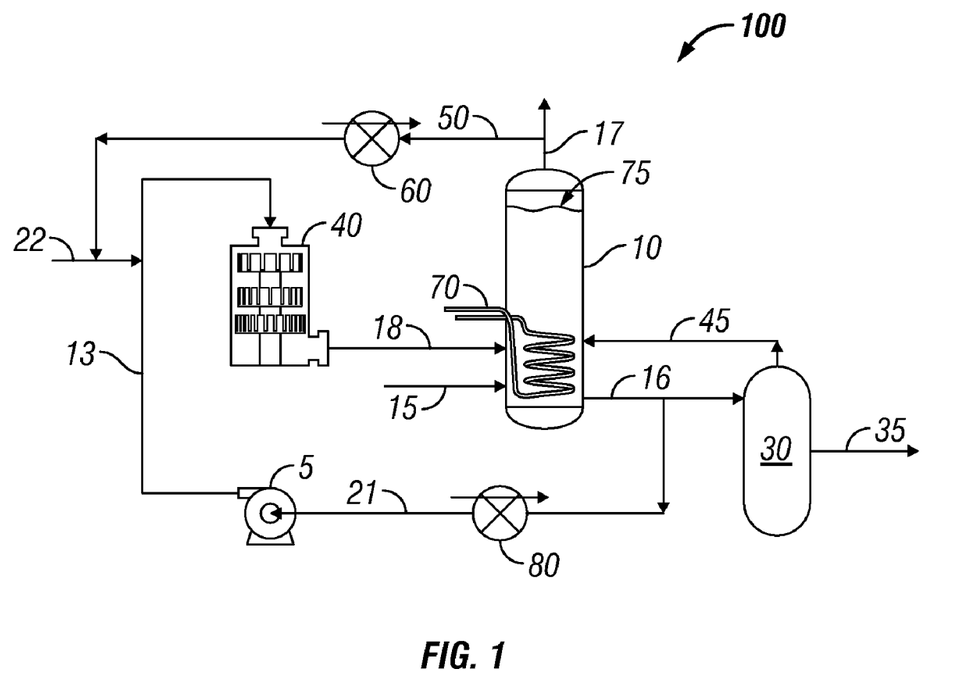
FIG. 1 is a process flow diagram of a high shear Fischer-Tropsch system for conversion of synthesis gas to C2+ hydrocarbons according to an embodiment of the present disclosure.

System for Fischer-Tropsch Conversion of Synthesis Gas to Hydrocarbons. A high shear Fischer-Tropsch conversion system will now be described in relation to FIG. 1, which is a process flow diagram of an embodiment of a high shear system 100 for conversion of synthesis gas into hydrocarbons. The basic components of a representative system include external high shear mixing device (HSD) 40, reactor 10, and pump 5. As shown in FIG. 1, high shear device 40 is located external to reactor 10. Each of these components is further described in more detail below. Line 21 is connected to pump 5 for introducing liquid medium into HSD 40. Line 13 connects pump 5 to HSD 40, and line 18 connects HSD 40 to reactor 10. Line 22 may be connected to line 13 for introducing a gas comprising carbon monoxide and hydrogen (i.e., synthesis gas). Alternatively, line 22 may be connected directly to HSD 40. Line 17 may be connected to reactor 10 for removal of unreacted carbon monoxide, hydrogen and/or other input gas or product gaseous C2+ hydrocarbons. In applications, line 17 may be fluidly connected to line 22 whereby a portion of the gas in line 17 may be recycled to HSD 40. Additional components or process steps may be incorporated between reactor 10 and HSD 40, or ahead of pump 5 or HSD 40, if desired, as will become apparent upon reading the description of the high shear Fischer-Tropsch process described hereinbelow. For example, as indicated in FIG. 1, heat transfer devices such as heat transfer devices 60 and 80 may be positioned throughout system 100 for removing the heat produced during exothermic Fischer-Tropsch conversion. Line 16 may be connected to line 21 or line 13 (e.g., from reactor 10), to provide for multi-pass operation, if desired.

In cases where Fischer-Tropsch catalyst is circulated through HSD 40 (e.g., when reactor 10 is operated as a circulated slurry loop reactor), high shear Fischer-Tropsch system 100 may further comprise separator 30. Separator 30 may be connected to reactor 10 via lines 16 and 45. Product from reactor 10 may be introduced to separator 30 via line 16. Line 45 may connect separator 30 to reactor 10 for return of catalyst slurry to reactor 10.

High shear Fischer-Tropsch system 100 may further comprise downstream processing units for upgrading the liquid and gaseous products from reactor 10 (not shown in FIG. 1).

High Shear Mixing Device. External high shear mixing device (HSD) 40, also sometimes referred to as a high shear device or high shear mixing device, is configured for receiving an inlet stream, via line 13, comprising liquid medium and synthesis gas. Alternatively, HSD 40 may be configured for receiving the liquid medium and synthesis gas streams via separate inlet lines (not shown). Although only one high shear device is shown in FIG. 1, it should be understood that some embodiments of the system may have two or more high shear mixing devices arranged either in series or parallel flow. HSD 40 is a mechanical device that utilizes one or more generator comprising a rotor/stator combination, each of which has a gap between the stator and rotor. The gap between the rotor and the stator in each generator set may be fixed or may be adjustable. HSD 40 is configured in such a way that it is capable of producing submicron and micron-sized reactant gas bubbles in a mixture flowing through the high shear device. The high shear device comprises an enclosure or housing so that the pressure and temperature of the reaction mixture may be controlled.

High shear mixing devices are generally divided into three general classes, based upon their ability to mix fluids. Mixing is the process of reducing the size of particles or inhomogeneous species within the fluid. One metric for the degree or thoroughness of mixing is the energy density per unit volume that the mixing device generates to disrupt the fluid particles. The classes are distinguished based on delivered energy densities. Three classes of industrial mixers having sufficient energy density to consistently produce mixtures or emulsions with particle sizes in the range of submicron to 50 microns include homogenization valve systems, colloid mills and high speed mixers. In the first class of high energy devices, referred to as homogenization valve systems, fluid to be processed is pumped under very high pressure through a narrow-gap valve into a lower pressure environment. The pressure gradients across the valve and the resulting turbulence and cavitation act to break-up any particles in the fluid. These valve systems are most commonly used in milk homogenization and can yield average particle sizes in the submicron to about 1 micron range.

At the opposite end of the energy density spectrum is the third class of devices referred to as low energy devices. These systems usually have paddles or fluid rotors that turn at high speed in a reservoir of fluid to be processed, which in many of the more common applications is a food product. These low energy systems are customarily used when average particle sizes of greater than 20 microns are acceptable in the processed fluid.

Between the low energy devices and homogenization valve systems, in terms of the mixing energy density delivered to the fluid, are colloid mills and other high speed rotor-stator devices, which are classified as intermediate energy devices. A typical colloid mill configuration includes a conical or disk rotor that is separated from a complementary, liquid-cooled stator by a closely-controlled rotor-stator gap, which is commonly between 0.0254 mm to 10.16 mm (0.001-0.40 inch). Rotors are usually driven by an electric motor through a direct drive or belt mechanism. As the rotor rotates at high rates, it pumps fluid between the outer surface of the rotor and the inner surface of the stator, and shear forces generated in the gap process the fluid. Many colloid mills with proper adjustment achieve average particle sizes of 0.1-25 microns in the processed fluid. These capabilities render colloid mills appropriate for a variety of applications including colloid and oil/water-based emulsion processing such as that required for cosmetics, mayonnaise, or silicone/silver amalgam formation, to roofing-tar mixing.

Tip speed is the circumferential distance traveled by the tip of the rotor per unit of time. Tip speed is thus a function of the rotor diameter and the rotational frequency. Tip speed (in meters per minute, for example) may be calculated by multiplying the circumferential distance transcribed by the rotor tip, $2\pi R$, where R is the radius of the rotor (meters, for example) times the frequency of revolution (for example revolutions per minute, rpm). A colloid mill, for example, may have a tip speed in excess of 22.9 m/s (4500 ft/min) and may exceed 40 m/s (7900 ft/min). For the purpose of this disclosure, the term 'high shear' refers to mechanical rotor stator devices (e.g., colloid mills or rotor-stator dispersers) that are capable of tip speeds in excess of 5.1 m/s. (1000 ft/min) and require an external mechanically driven power device to drive energy into a stream comprising liquid medium and gaseous reactants. For example, in HSD 40, a tip speed in excess of 22.9 m/s (4500 ft/min) is achievable, and may exceed 40 m/s (7900 ft/min). In some embodiments, HSD 40 is capable of delivering at least 300 L/h at a tip speed of at least 22.9 m/s (4500 ft/min). The power consumption may be about 1.5 kW. HSD 40 combines high tip speed with a very small shear gap to produce significant shear on the material being processed. The amount of shear will be dependent on the viscosity of the fluid. Accordingly, a local region of elevated pressure and temperature is created at the tip of the rotor during operation of the high shear device. In some cases the locally elevated pressure is about 1034.2 MPa (150,000 psi). In some cases the locally elevated temperature is about 500° C. In some cases, these local pressure and temperature elevations may persist for nano or pico seconds.

An approximation of energy input into the fluid (kW/L/min) can be estimated by measuring the motor energy (kW) and fluid output (L/min). As mentioned above, tip speed is the velocity (ft/min or m/s) associated with the end of the one or more revolving elements that is creating the mechanical force applied to the reactants. In embodiments, the energy expenditure of HSD 40 is greater than 1000 W/m³. In embodiments, the energy expenditure of HSD 40 is in the range of from about 3000 W/m³ to about 7500 W/m³.

The shear rate is the tip speed divided by the shear gap width (minimal clearance between the rotor and stator). The shear rate generated in HSD 40 may be in the greater than 20,000 s$^{-1}$. In some embodiments the shear rate is at least 40,000 s$^{-1}$. In some embodiments the shear rate is at least 100,000 s$^{-1}$. In some embodiments the shear rate is at least 500,000 s$^{-1}$. In some embodiments the shear rate is at least 1,000,000 s$^{-1}$. In some embodiments the shear rate is at least 1,600,000 s$^{-1}$. In embodiments, the shear rate generated by HSD 40 is in the range of from 20,000 s$^{-1}$ to 100,000 s$^{-1}$. For example, in one application the rotor tip speed is about 40 m/s (7900 ft/min) and the shear gap width is 0.0254 mm (0.001 inch), producing a shear rate of 1,600,000 s$^{-1}$. In another application the rotor tip speed is about 22.9 m/s (4500 ft/min) and the shear gap width is 0.0254 mm (0.001 inch), producing a shear rate of about 901,600 s$^{-1}$ HSD 40 is capable of highly dispersing or transporting synthesis gas into a main liquid phase (continuous phase) comprising liquid medium, with which it would normally be immiscible. In embodiments, the liquid medium further comprises a circulating catalyst. In some embodiments, HSD 40 comprises a colloid mill. Suitable colloidal mills are manufactured by IKA® Works, Inc. Wilmington, N.C. and APV North America, Inc. Wilmington, Mass., for example. In some instances, HSD 40 comprises the Dispax Reactor® of IKA® Works, Inc.

The high shear device comprises at least one revolving element that creates the mechanical force applied to the reactants. The high shear device comprises at least one stator and at least one rotor separated by a clearance. For example, the rotors may be conical or disk shaped and may be separated from a complementarily-shaped stator. In embodiments, both the rotor and stator comprise a plurality of circumferentially-spaced teeth. In some embodiments, the stator(s) are adjustable to obtain the desired shear gap between the rotor and the stator of each generator (rotor/stator set). Grooves between the teeth of the rotor and/or stator may alternate direction in alternate stages for increased turbulence. Each generator may be driven by any suitable drive system configured for providing the necessary rotation.

In some embodiments, the minimum clearance (shear gap width) between the stator and the rotor is in the range of from about 0.0254 mm (0.001 inch) to about 3.175 mm (0.125 inch). In certain embodiments, the minimum clearance (shear gap width) between the stator and rotor is about 1.52 mm (0.060 inch). In certain configurations, the minimum clearance (shear gap) between the rotor and stator is at least 1.78 mm (0.07 inch). The shear rate produced by the high shear device may vary with longitudinal position along the flow pathway. In some embodiments, the rotor is set to rotate at a speed commensurate with the diameter of the rotor and the desired tip speed. In some embodiments, the high shear device has a fixed clearance (shear gap width) between the stator and rotor. Alternatively, the high shear device has adjustable clearance (shear gap width).

In some embodiments, HSD 40 comprises a single stage dispersing chamber (i.e., a single rotor/stator combination, a single generator). In some embodiments, high shear device 40 is a multiple stage inline disperser and comprises a plurality of generators. In certain embodiments, HSD 40 comprises at least two generators. In other embodiments, high shear device 40 comprises at least 3 high shear generators. In some embodiments, high shear device 40 is a multistage mixer whereby the shear rate (which, as mentioned above, varies proportionately with tip speed and inversely with rotor/stator gap width) varies with longitudinal position along the flow pathway, as further described herein below.

In some embodiments, each stage of the external high shear device has interchangeable mixing tools, offering flexibility. For example, the DR2000/4 Dispax Reactor® of IKA® Works, Inc. Wilmington, N.C. and APV North America, Inc. Wilmington, Mass., comprises a three stage dispersing module. This module may comprise up to three rotor/stator combinations (generators), with choice of fine, medium, coarse, and super-fine for each stage. This allows for creation of dispersions having a narrow distribution of the desired bubble size (e.g., synthesis gas bubbles). In some embodiments, each of the stages is operated with super-fine generator. In some embodiments, at least one of the generator sets has a rotor/stator minimum clearance (shear gap width) of greater than about 5.08 mm (0.20 inch). In alternative embodiments, at least one of the generator sets has a minimum rotor/stator clearance of greater than about 1.78 mm (0.07 inch).

Figure 2:
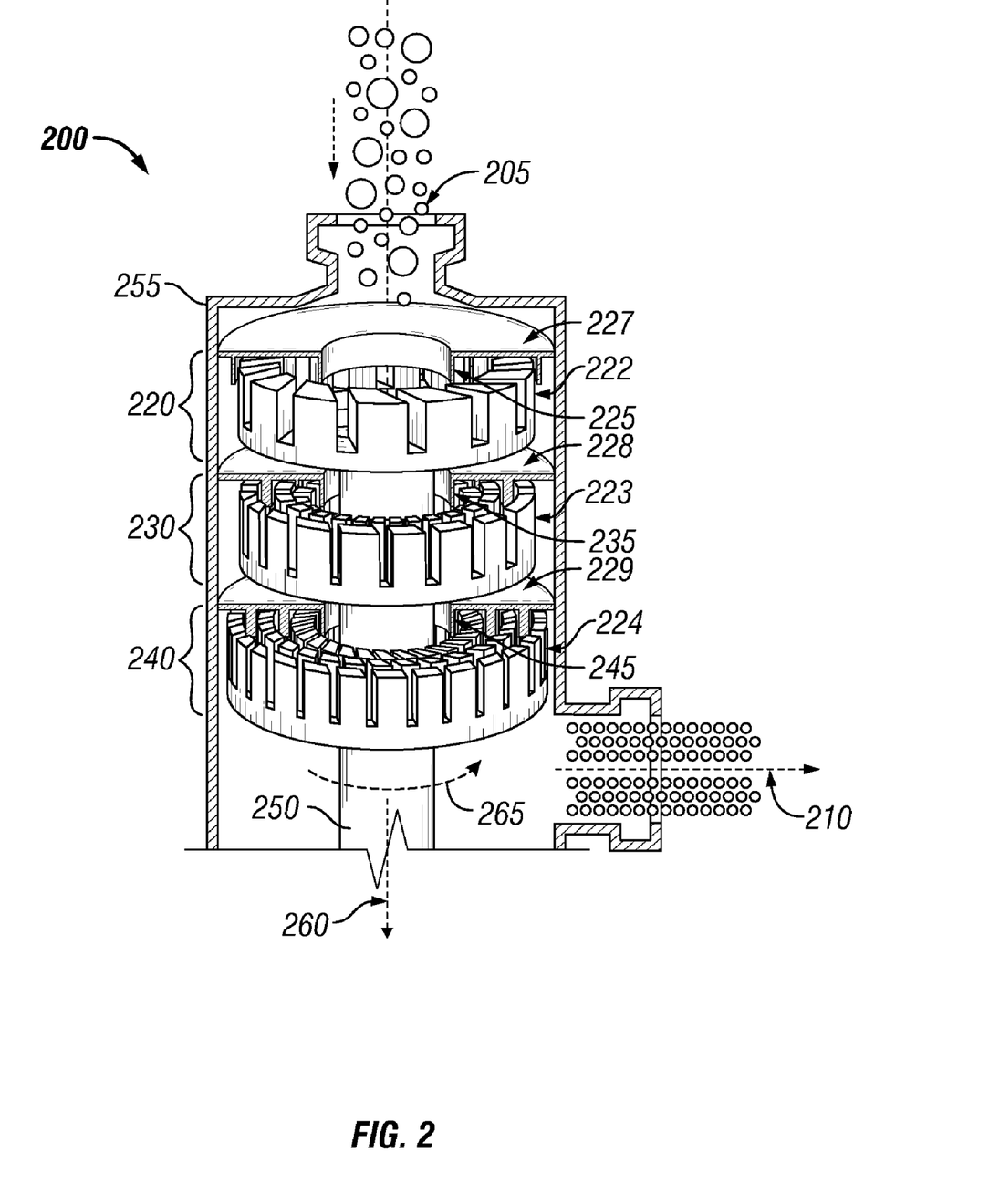
FIG. 2 is a longitudinal cross-section view of a multi-stage high shear device.

Referring now to FIG. 2, there is presented a longitudinal cross-section of a suitable high shear device 200. High shear device 200 of FIG. 2 is a dispersing device comprising three stages or rotor-stator combinations. High shear device 200 is a dispersing device comprising three stages or rotor-stator combinations, 220, 230, and 240. The rotor-stator combinations may be known as generators 220, 230, 240 or stages without limitation. Three rotor/stator sets or generators 220, 230, and 240 are aligned in series along drive shaft 250.

First generator 220 comprises rotor 222 and stator 227. Second generator 230 comprises rotor 223, and stator 228. Third generator 240 comprises rotor 224 and stator 229. For each generator the rotor is rotatably driven by input 250 and rotates about axis 260 as indicated by arrow 265. The direction of rotation may be opposite that shown by arrow 265 (e.g., clockwise or counterclockwise about axis of rotation 260). Stators 227, 228, and 229 are fixably coupled to the wall 255 of high shear device 200.

As mentioned hereinabove, each generator has a shear gap width which is the minimum distance between the rotor and the stator. In the embodiment of FIG. 2, first generator 220 comprises a first shear gap 225; second generator 230 comprises a second shear gap 235; and third generator 240 comprises a third shear gap 245. In embodiments, shear gaps 225, 235, 245 have widths in the range of from about 0.025 mm to about 10.0 mm. Alternatively, the process comprises utilization of a high shear device 200 wherein the gaps 225, 235, 245 have a width in the range of from about 0.5 mm to about 2.5 mm. In certain instances the shear gap width is maintained at about 1.5 mm. Alternatively, the width of shear gaps 225, 235, 245 are different for generators 220, 230, 240. In certain instances, the width of shear gap 225 of first generator 220 is greater than the width of shear gap 235 of second generator 230, which is in turn greater than the width of shear gap 245 of third generator 240. As mentioned above, the generators of each stage may be interchangeable, offering flexibility. High shear device 200 may be configured so that the shear rate will increase stepwise longitudinally along the direction of the flow 260.

Generators 220, 230, and 240 may comprise a coarse, medium, fine, and super-fine characterization. Rotors 222, 223, and 224 and stators 227, 228, and 229 may be toothed designs. Each generator may comprise two or more sets of rotor-stator teeth. In embodiments, rotors 222, 223, and 224 comprise more than 10 rotor teeth circumferentially spaced about the circumference of each rotor. In embodiments, stators 227, 228, and 229 comprise more than ten stator teeth circumferentially spaced about the circumference of each stator. In embodiments, the inner diameter of the rotor is about 12 cm. In embodiments, the diameter of the rotor is about 6 cm. In embodiments, the outer diameter of the stator is about 15 cm. In embodiments, the diameter of the stator is about 6.4 cm. In some embodiments the rotors are 60 mm and the stators are 64 mm in diameter, providing a clearance of about 4 mm. In certain embodiments, each of three stages is operated with a super-fine generator, comprising a shear gap of between about 0.025 mm and about 4 mm. For applications in which solid catalyst particles are to be sent through high shear device 40, the appropriate shear gap width (minimum clearance between rotor and stator) may be selected for an appropriate reduction in particle size and increase in particle surface area. In embodiments, this may be beneficial for increasing catalyst surface area by shearing and dispersing the particles.

High shear device 200 is configured for receiving from line 13 a fluid mixture at inlet 205. The mixture comprises carbon monoxide and hydrogen gas as the dispersible phase and liquid medium as the continuous phase. In embodiments, the fluid mixture further comprises a particulate solid catalyst component. Feed stream entering inlet 205 is pumped serially through generators 220, 230, and then 240, such that product dispersion is formed. Product dispersion exits high shear device 200 via outlet 210 (and line 18 of FIG. 1). The rotors 222, 223, 224 of each generator rotate at high speed relative to the fixed stators 227, 228, 229, providing a high shear rate. The rotation of the rotors pumps fluid, such as the feed stream entering inlet 205, outwardly through the shear gaps (and, if present, through the spaces between the rotor teeth and the spaces between the stator teeth), creating a localized high shear condition. High shear forces exerted on fluid in shear gaps 225, 235, and 245 (and, when present, in the gaps between the rotor teeth and the stator teeth) through which fluid flows process the fluid and create product dispersion. Product dispersion exits high shear device 200 via high shear outlet 210 (and line 18 of FIG. 1).

The product dispersion comprising synthesis gas bubbles, and optionally catalyst particles, in a continuous liquid phase may be referred to as an emulsion. The product dispersion has an average gas bubble size less than about 5 µm. In embodiments, HSD 40 produces a dispersion having a mean bubble size of less than about 1.5 µm. In embodiments, HSD 40 produces a dispersion having a mean bubble size of less than 1 µm; preferably the bubbles are sub-micron in diameter. In certain instances, the average bubble size is from about 0.1 µm to about 1.0 µm. In embodiments, HSD 40 produces a dispersion having a mean bubble size of less than 400 nm. In embodiments, HSD 40 produces a dispersion having a mean bubble size of less than 100 nm. High shear device 200 produces a dispersion comprising gas bubbles capable of remaining dispersed at atmospheric pressure for at least about 15 minutes.

Not to be limited by theory, it is known in emulsion chemistry that sub-micron particles, or bubbles, dispersed in a liquid undergo movement primarily through Brownian motion effects. The bubbles in the product dispersion created by high shear device 200 may have greater mobility through boundary layers of solid catalyst particles, thereby facilitating and accelerating the catalytic reaction through enhanced transport of reactants.

In certain instances, high shear device 200 comprises a Dispax Reactor® of IKA® Works, Inc. Wilmington, N.C. and APV North America, Inc. Wilmington, Mass. Several models are available having various inlet/outlet connections, horsepower, tip speeds, output rpm, and flow rate. Selection of the high shear device will depend on throughput requirements and desired catalyst particle and/or bubble size in dispersion in line 18 (FIG. 1) exiting outlet 210 of high shear device 200. IKA® model DR 2000/4, for example, comprises a belt drive, 4M generator, PTFE sealing ring, inlet flange 25.4 mm (1 inch) sanitary clamp, outlet flange 19 mm (¾ inch) sanitary clamp, 2 HP power, output speed of 7900 rpm, flow capacity (water) approximately 300-700 L/h (depending on generator), a tip speed of from 9.4-41 m/s (1850 ft/min to 8070 ft/min).

Reactor 10. The Fischer-Tropsch reaction is a heterogeneous catalytic reaction involving a solid catalyst, gaseous carbon monoxide and hydrogen reactants, and liquid product. Reactor 10 may be any type of reactor in which Fischer-Tropsch reaction may be carried out. For instance, a continuous or semi-continuous stirred tank reactor, or one or more batch reactors may be employed in series or in parallel. In embodiments, reactor 10 comprises one or more tank or tubular reactor in series or in parallel. Fischer-Tropsch reactor 10 may be operated as a multitubular fixed bed reactor, a fixed slurry bed reactor, a fixed fluidized bed reactor, or a circulating fluidized bed reactor as known to those of skill in the art.

Any number of reactor inlet lines is envisioned, with three shown in FIG. 1 (lines 15, 18 and 45). Line 18 provides the dispersion of reactant gas comprising carbon monoxide and hydrogen to reactor 10. Line 18 may introduce the dispersion into the bottom half of reactor 10, alternatively, the bottom 25% of reactor 10. Inlet line 15 may be connected to reactor 10 for receiving a catalyst solution or slurry during operation and/or during initiation of the system. When reactor 10 is operated as a circulating slurry reactor, inlet line 45 may be connected with separator 30 for introducing concentrated catalyst slurry from which liquid product has been removed to reactor 10. Reactor 10 may comprise exit line 17 for extracting gas from the top portion of reactor 10. Line 16 is connected to a bottom portion of reactor 10 for removing liquid product from reactor 10. In embodiments where a fixed bed of catalyst is utilized, i.e. where reactor 10 is a multi-tubular fixed bed, a fixed fluidized bed, or a fixed slurry bed, outlet line 16 may comprise no catalyst, and a separator may serve to separate liquid medium from the product hydrocarbons, or separator 30 may be absent in some applications. It is envisaged that reactor 10 may comprise a plurality of reactor product lines 16.

Fischer-Tropsch conversion will occur whenever suitable time, temperature and pressure conditions exist. In this sense synthesis gas conversion could occur at any point in the flow diagram of FIG. 1 if temperature and pressure conditions are suitable. Where a circulating slurry-based catalyst is utilized (i.e., when line 21 contains catalyst particles), reaction is more likely to occur at points outside reactor 10 shown of FIG. 1, than when catalyst is constrained to reactor 10. Nonetheless a discrete reactor 10 is often desirable to allow for increased residence time, agitation and heating and/or cooling.

Reactor 10 may include one or more of the following components: stirring system, temperature control system, pressure measurement instrumentation, temperature measurement instrumentation, one or more injection points, and level regulator (not shown), as are known in the art of reaction vessel design. For example, a stirring system may include a motor driven mixer. A temperature control system may comprise, for example, a heat exchanger 70 with cooling coils or heat transfer tubes. Alternatively, as much of the conversion reaction may occur within HSD 40 in some embodiments, reactor 10 may serve primarily as a storage vessel in some cases. Although generally less desired, in some applications reactor 10 may be omitted, particularly if multiple high shear devices 40 are employed in series, as further described below.

Separator 30. Separator 30 may be any apparatus suitable for separating a concentrated catalyst slurry from the liquid hydrocarbon products produced in system 100 and any liquid medium charged to the system. Separator 30 may be, for example, selected from hydrocyclones, gravity separators, filters, and magnetic separators. In some embodiments, separator 30 may be a distillation column, whereby liquid hydrocarbons and liquid charge may be separated from Fischer-Tropsch catalyst. In embodiments where gas is removed with liquid hydrocarbon product in line 16, an additional separator may serve to separate gaseous product and unreacted carbon monoxide and hydrogen from liquid hydrocarbon product and liquid medium. Unreacted carbon monoxide and hydrogen may be separated from low-boiling gaseous hydrocarbon and recycled to HSD 40. If the product in line 16 comprises catalyst, the separated liquid hydrocarbon product may then be introduced into separator 30 for removal of a concentrated catalyst stream from the liquid hydrocarbon product.

Heat Transfer Devices. In addition to the above-mentioned heating/cooling capabilities of reactor 10, other external or internal heat transfer devices for heating or cooling a process stream are also contemplated in variations of the embodiments illustrated in FIG. 1. As Fischer-Tropsch conversion is highly exothermic, heat may be removed from reactor 10 via any method known to one skilled in the art. For example, reactor 10 may comprise one or more internal heat transfer devices 70. The use of external heating and/or cooling heat transfer devices is also contemplated. Some suitable locations for one or more such heat transfer devices are between pump 5 and HSD 40, between HSD 40 and reactor 10, and upstream of pump 5. In the embodiment of FIG. 1, heat transfer device 60 is positioned on gas recycle line 50. In embodiments, heat transfer device 60 is a condenser. The embodiment of FIG. 1 also comprises a heat transfer device 80 positioned on line 21. Heat transfer device 80 may be, for example, a condenser. Some non-limiting examples of such heat transfer devices are condensers, and shell, tube, plate, and coil heat exchangers, as are known in the art.

Pumps. Pump 5 is configured for either continuous or semi-continuous operation, and may be any suitable pumping device that is capable of providing greater than 202.65 kPa (2 atm) pressure, preferably greater than 303.975 kPa (3 atm) pressure, to allow controlled flow through HSD 40 and system 100. For example, a Roper Type 1 gear pump, Roper Pump Company (Commerce Ga.) Dayton Pressure Booster Pump Model 2P372E, Dayton Electric Co (Niles, Ill.) is one suitable pump. Preferably, all contact parts of the pump comprise stainless steel, for example, 316 stainless steel. In some embodiments of the system, pump 5 is capable of pressures greater than about 2026.5 kPa (20 atm). In addition to pump 5, one or more additional, high pressure pump (not shown) may be included in the system illustrated in FIG. 1. For example, a booster pump, which may be similar to pump 5, may be included between HSD 40 and reactor 10 for boosting the pressure into reactor 10. Such a booster pump may be capable of pressures of from about 500 kPa (72.5 psi) to about 1500 kPa (725 psi), from about 1500 kPa (218 psi) to about 3500 kPa (508 psi), or from about 2000 kPa (290 psi) to about 3000 kPa (435 psi). As another example, a supplemental feed pump, which may be similar to pump 5, may be included for introducing additional reactants or catalyst into reactor 10, for example, via line 15.

Production of Hydrocarbons by Fischer-Tropsch Conversion of Synthesis Gas

Operation of high shear synthesis gas conversion system 100 will now be discussed with reference to FIG. 1. The system is initially charged with a suitable liquid medium within which the Fischer-Tropsch reactant gases will be dispersed. The initial liquid medium charge may be a variety of types. Suitable hydrocarbon liquids include any aliphatic or aromatic low viscosity organic liquid. Any inert carrier such as silicone oil may also be utilized. Other fluids such as water may also be utilized; however, the resulting dissociation of water may cause co-products of alcohols and aldehydes to be formed. In general the presence of any source of oxygen is undesirable due to the possible oxidation of CO to $CO_2$. Selection of the liquid will be dependent on the desired reaction products from the Fischer-Tropsch process and their solubility in the selected organic liquid. Desirably, the initial charge of liquid medium comprises one or more liquid hydrocarbon product produced by the Fischer-Tropsch reaction such that no separation is needed to separate liquid hydrocarbon products produced in high shear system 100 from the initial charge of liquid medium.

Dispersible gas line 22 comprises synthesis gas to be converted via Fischer Tropsch conversion to C2+ hydrocarbons. The synthesis gas may be prepared or obtained using any method known in the art, including partial oxidation of hydrocarbons, steam reforming, and autothermal reforming. The length of the hydrocarbon chain produced via Fischer-Tropsch conversion is affected by the composition (or ratio of hydrogen to carbon monoxide) of the synthesis gas, the reaction conditions, and the catalyst selectivity. In embodiments, the $H_2$:CO ratio of the dispersible synthesis gas stream introduced via line 22 is from about 1:1 to about 5:1. In embodiments, the $H_2$:CO ratio of the dispersible synthesis gas stream introduced via line 22 is from about 1.7:1 to about 3:1. In embodiments, the $H_2$:CO ratio is about 2. Typically, synthesis gas is produced via gas reformation or gasification of solids, depending on the raw material or feedstock available. In embodiments, carbon monoxide and hydrogen gas in dispersible line 22 is produced via reforming or partial oxidation of natural gas. In embodiments, synthesis gas in line 22 is obtained via gasification of a solid material such as, but not limited to, coal, biomass, and bio-renewables.

In embodiments, the dispersible gas is fed directly into HSD 40, instead of being combined with the liquid reactant stream (i.e., liquid medium) in line 13. Pump 5 may be operated to pump the liquid stream (which will comprise liquid medium and may also comprise product hydrocarbons for multiple cycle operation and which may comprise product hydrocarbons and catalyst, for circulated slurry operation) through line 21, and to build pressure and feed HSD 40, providing a controlled flow throughout HSD 40 and high shear system 100. In some embodiments, pump 5 increases the pressure of the HSD inlet stream to greater than 200 kPa (29 psi), greater than about 300 kPa (43.5 psi), greater than about 500 kPa (72.5 psi), greater than about 1000 kPa (145 psi), or greater than 1500 kPa (218 psi). In this way, high shear system 100 may combine high shear with pressure to enhance reactant intimate mixing.

A heat exchange device may be positioned on line 21 or line 13 for cooling the liquid medium. In the embodiment of FIG. 1, heat exchange device 80 is positioned on line 21.

After pumping, the dispersible gas from line 22 and the liquid from line 13 are mixed within HSD 40, which serves to create a fine dispersion of the carbon monoxide and hydrogen gas in the liquid. In enclosed, external, HSD 40, the synthesis gas and the liquid are highly dispersed such that nanobubbles, submicron bubbles, and/or microbubbles of the gaseous reactants in liquid medium are formed for superior dissolution into solution and enhancement of reactant mixing. For example, disperser IKA® model DR 2000/4, a high shear, three stage dispersing device configured with three rotors in combination with stators, aligned in series, may be used to create the dispersion of dispersible carbon monoxide and hydrogen gas reactants in liquid medium comprising hydrocarbons. The rotor/stator sets may be configured as illustrated in FIG. 2, for example. The dispersed reactants enter the high shear device via line 13 and enter a first stage rotor/stator combination. The rotors and stators of the first stage may have circumferentially spaced first stage rotor teeth and stator teeth, respectively. The coarse dispersion exiting the first stage enters the second rotor/stator stage. The rotor and stator of the second stage may also comprise circumferentially spaced rotor teeth and stator teeth, respectively. The reduced bubble-size dispersion emerging from the second stage enters the third stage rotor/stator combination, which may comprise a rotor and a stator having rotor teeth and stator teeth, respectively. The dispersion exits the high shear device via line 18. The dispersion may further catalyst particles in embodiments in which catalyst is circulated through HSD 40. In some embodiments, the shear rate increases stepwise longitudinally along the direction of the flow, 260.

For example, in some embodiments, the shear rate in the first rotor/stator stage is greater than the shear rate in subsequent stage(s). In other embodiments, the shear rate is substantially constant along the direction of the flow, with the shear rate in each stage being substantially the same.

If the high shear device 40 includes a PTFE seal, the seal may be cooled using any suitable technique that is known in the art. For example, fresh catalyst slurry or optional injected low-boiling hydrocarbon streams (not shown in FIG. 1) may be used to cool the seal and in so doing be preheated as desired prior to entering high shear system 100, for example before entering high shear device 40.

The rotor(s) of HSD 40 may be set to rotate at a speed commensurate with the diameter of the rotor and the desired tip speed. As described above, the high shear device (e.g., colloid mill or toothed rim disperser) has either a fixed clearance between the stator and rotor or has adjustable clearance. HSD 40 serves to intimately mix the synthesis gas and the liquid medium (i.e., fluid stream in line 13 comprising liquid medium, and optionally comprising product hydrocarbons and/or catalyst). In some embodiments of the process, the transport resistance of the reactants is reduced by operation of the high shear device such that the velocity of the reaction is increased by greater than about 5%. In some embodiments of the process, the transport resistance of the reactants is reduced by operation of the high shear device such that the velocity of the reaction is increased by greater than a factor of about 5. In some embodiments, the velocity of the reaction is increased by at least a factor of 10. In some embodiments, the velocity is increased by a factor in the range of about 10 to about 100 fold.

In some embodiments, HSD 40 delivers at least 300 L/h at a tip speed of at least 4500 ft/min, and which may exceed 7900 ft/min (40 m/s). The power consumption may be about 1.5 kW. Although measurement of instantaneous temperature and pressure at the tip of a rotating shear unit or revolving element in HSD 40 is difficult, it is estimated that the localized temperature seen by the intimately mixed reactants is in excess of 500° C. and at pressures in excess of 500 kg/cm$^2$ under cavitation conditions. The high shear mixing results in dispersion of the synthesis gas in micron or submicron-sized bubbles. In some embodiments, the resultant dispersion has an average bubble size less than about 1.5 μm. Accordingly, the dispersion exiting HSD 40 via line 18 comprises micron and/or submicron-sized gas bubbles. In some embodiments, the mean bubble size is in the range of about 0.4 μm to about 1.5 μm. In some embodiments, the resultant dispersion has an average bubble size less than 1 μm. In some embodiments, the mean bubble size is less than about 400 nm, and may be about 100 nm in some cases. In many embodiments, the microbubble dispersion is able to remain dispersed at atmospheric pressure for at least 15 minutes.

Once dispersed, the resulting gas/liquid or gas/liquid/solid dispersion exits HSD 40 via line 18 and feeds into reactor 10, as illustrated in FIG. 1. Optionally, the dispersion may be further processed (e.g., cooled) prior to entering reactor 10, if desired. In reactor 10, Fischer-Tropsch conversion occurs/continues via contact with Fischer-Tropsch catalyst.

In embodiments, liquid medium, and catalyst are first mixed in reactor 10. Liquid medium and catalyst may enter reactor 10 as a slurry via, for example, inlet line 15. Any number of reactor inlet lines is envisioned, with three shown in FIG. 1 (lines 15, 18 and 45). In an embodiment, reactor 10 is charged with catalyst and the catalyst if required, is activated according to procedures recommended by the catalyst vendor(s), prior to introduction of dispersible gas comprising carbon monoxide and hydrogen into HSD 40.

In embodiments, as shown in FIG. 1, reactor 10 catalyst slurry is circulated through HSD 40. In such embodiments, product in line 16 comprises catalyst, along with liquid product hydrocarbons, and liquid medium (which was used during start-up, for example). In some embodiments, reactor 10 comprises a fixed catalyst bed (e.g., a fixed slurry bed), and catalyst is not removed with liquid product in line 16 and catalyst is not circulated through HSD 40. In fixed catalyst embodiments, wherein catalyst is not circulated through HSD 40, product in line 16 comprises product hydrocarbon and liquid medium. Such product may be sent directly for further processing, or may be recycled, via line 21 for example, to HSD 40 for multi-pass operation.

In the embodiment of FIG. 1, gas stream is removed via line 17 from a gas cap above the level 75 of catalyst suspension or catalyst bed within reactor 10. In other instances, unreacted synthesis gas and product gases (e.g., hydrocarbons with less than 6 carbons) are removed from reactor 10 via line 16 as a mixed stream with liquid hydrocarbon product. In such applications, gaseous and liquid hydrocarbon products may be separated from unreacted carbon monoxide and hydrogen gas in apparatus external to reactor 10. In such embodiments, product removed via line 16 may comprise gaseous hydrocarbon product and unreacted reactant synthesis gas in addition to liquid hydrocarbon product and optionally catalyst. As mentioned above, in such instances, a separator (not shown) may be used to separate unreacted synthesis gas for recycle to HSD 40.

As a result of the intimate mixing of the gaseous reactants prior to entering reactor 10, a significant portion of the chemical reaction may take place in HSD 40, when catalyst is circulated throughout system 100. Accordingly, in some embodiments, reactor 10 may be used primarily for heating/cooling and separation of product hydrocarbons from unreacted reactant and product gases. Alternatively, or additionally, reactor 10 may serve as a primary reaction vessel, especially in cases where catalyst is not circulated throughout system 100 but is associated with reactor 10, where most of the product hydrocarbon is produced. For example, in embodiments, reactor 10 is a fixed bed reactor (e.g., a fixed fluidized bed reactor, a fixed slurry bed reactor, or a multi-tubular fixed bed reactor) comprising catalyst, and the catalyst is not circulated through HSD 40. In such embodiments, although catalyst may not circulate through HSD 40, catalyst (or slurry) may still be added to or removed from reactor 10 or may be looped about reactor 10. That is, although in some embodiments catalyst is not circulated through HSD 40, catalyst may still be circulated internally within reactor 10 or may be looped, introduced, or removed from reactor 10.

Reactor 10 may be operated in either continuous or semi-continuous flow mode, or it may be operated in batch mode. The contents of reactor 10 may be maintained at a specified reaction temperature using heating and/or cooling capabilities (e.g., cooling coils) and temperature measurement instrumentation. As Fischer-Tropsch is highly exothermic, reactor 10 may comprise an internal heat exchanger 70. Internal heat exchanger 70 may be, for example, one or more cooling coils/heat transfer tubes positioned within reactor 10. Pressure in reactor 10 may be monitored using suitable pressure measurement instrumentation, and the level of catalyst suspension in reactor 10 may be controlled using a level regulator (not shown), employing techniques that are known to those of skill in the art. The contents may be stirred continuously or semi-continuously.

Catalyst. High shear system 100 comprises a suitable Fischer-Tropsch catalyst, as known in the art. In embodiments, the catalyst is circulated throughout the system, via lines 16, 21, 13, and 18. In other embodiments, a fixed catalyst is utilized, and the catalyst remains within reactor 10. In any event, a suitable Fischer-Tropsch catalyst is utilized. For example, the Fischer-Tropsch catalyst may comprise a supported or unsupported Group 8, 9, or 10 metal. In embodiments, the Group VIII metal is selected form iron, cobalt, ruthenium, nickel, and combinations thereof. The activity of nickel and ruthenium catalysts is conventionally not great enough for commercial use and the price of ruthenium often makes it an unattractive option. Typically, iron is much less costly, while cobalt has the advantage of higher activity and longer life. Because the incorporation of high shear may permit operation at lower temperature and more effective catalyst utilization, the disclosed system and method may make the use of ruthenium and nickel more attractive. The catalyst metal may be supported on an inorganic refractory oxide, such as alumina, silica, silica-alumina, titania, zinc oxide, and Group 4 oxides. The catalyst may further comprise a promoter metal selected from ruthenium, platinum, palladium, rhenium, cerium, hafnium, zirconium, lanthanum, copper and combinations thereof.

Suitable Fischer-Tropsch catalyst may be introduced into reactor 10 via line 15, as a slurry of catalyst in liquid medium or as a catalyst stream. In some embodiments, the catalyst is added continuously to reactor 10 via line 15. In embodiments, reactor 10 comprises a fixed bed of suitable catalyst. In embodiments, catalyst is introduced into reactor 10 and activated according to manufacturer's protocol prior to initiating synthesis gas conversion. Alternatively, or additionally, fresh catalyst may be added elsewhere in high shear Fischer-Tropsch system 100. For example, fresh catalyst slurry may be injected into line 21 or into line 45. Spent catalyst may be removed from system 100 and replaced with fresh catalyst as needed. For example, a portion of catalyst in line 45 may be removed and new catalyst introduced into reactor 10, for example via line 15. Thus, in some embodiments, line 21 comprises hydrocarbon product, liquid medium (which may be hydrocarbon product) and catalyst, and in other embodiments, line 21 carries a fluid stream comprising hydrocarbon product and liquid medium, with no catalyst.

Synthesis gas in dispersible gas line 22 is converted into gaseous and liquid hydrocarbons (e.g., olefins, paraffins, and oxygenated products) via contact with a Fischer-Tropsch catalyst. The Fischer-Tropsch process may be performed either as a high temperature Fischer-Tropsch (HTFT) process, or, perhaps more desirably, a low temperature Fischer-Tropsch (LTFT) process. In embodiments, the Fischer-Tropsch conversion is operated as a LTFT process, and the operating temperature is in the range of from about 180° C. to about 240° C. In embodiments, the Fischer-Tropsch conversion is operated as a HTFT process, and the temperature is in the range of from about 300° C. to 350° C. In embodiments, HTFT is selected, and the catalyst comprises iron. In embodiments, LTFT is selected, and the catalyst comprises iron or cobalt. In embodiments, the temperature of reactor 10 is maintained in the range of from about 180° C. to about 280° C., alternatively, in the range of from 190° C. to 240° C.

In embodiments, the reactor 10 pressure may be from about 500 kPa (72.5 psi) to about 1500 kPa (725 psi). In embodiments, the reactor 10 pressure may be from about 1500 kPa (218 psi) to about 3500 kPa (508 psi). In embodiments, the reactor 10 pressure may be from about 2000 kPa (290 psi) to about 3000 kPa (435 psi). In embodiments, reactor 10 is operated at near atmospheric pressure.

Product hydrocarbons may be produced either continuously, semi-continuously or batch wise, as desired for a particular application. Unreacted gas and product gas may exit reactor 10 via gas line 17. This gas stream may comprise unreacted carbon monoxide and hydrogen, as well as low-boiling product hydrocarbons, vaporized water, and inert gas. The reaction gas removed via line 17 may be further treated, and the components may be recycled, as desired. For example, a portion of the gas in line 17 may be removed as purge. Gaseous C2+ hydrocarbons (generally having less than 6 carbon atoms) may be separated from the purge stream and recycled to high shear system 100 or sent for downstream processing. A portion of the gas in line 17 may be recycled as reactant to HSD 40 via line 50. Heat produced by the exothermic Fischer-Tropsch reaction may desirably be removed from the portion of gas in line 17 recycled to HSD 40. In embodiments, low-boiling product hydrocarbons and vaporized water may be removed from the reactant gas and gaseous hydrocarbons having from one to three carbon atoms (e.g., methane, ethane, propane) by introducing the gas into a condenser 60. The condensed liquids comprising water and low boiling hydrocarbons may thus be separated (and exit high shear system 100) from a gas stream comprising carbon monoxide, hydrogen, and gaseous hydrocarbons having from one to three carbon atoms. The gas stream from condenser 60 may be recycled to reactor 10 via line 22. If gaseous reactants in line 22 have not been pre-cooled, line 22 may be introduced into line 50 such that fresh gaseous reactants are cooled in heat exchanger 60.

Liquid hydrocarbon products of $C5^+$ are extracted from high shear Fischer-Tropsch system 100 via product outlet line 16. Product outlet line 16 may be positioned within the lower 50% of reactor 10, alternatively, within the lower 20% of reactor 10. Fluid may be continuously circulated via line 21 and the Fischer-Tropsch conversion continued over a time period sufficient to produce a desired hydrocarbon product, after which the reaction is terminated as known to those of skill in the art. Catalyst reactivation may be accomplished by means known to those experienced in the art.

In embodiments, product stream in line 16 comprises product hydrocarbons, liquid medium, and catalyst. In embodiments, product in line 16 comprises product hydrocarbons and liquid medium. When a circulating catalyst slurry is utilized, hydrocarbon product stream comprising product hydrocarbons, liquid medium, and catalyst may be introduced into a separator 30 for separation of the product from the catalyst. Separated concentrated catalyst slurry may be recycled to reactor 10 via, for example, line 45. Catalyst-free product may be sent for further processing, for example, via line 35.

In embodiments, at least a portion of reactor discharge in line 16 is introduced to line 21 pump 5 and circulated to HSD 40. In such embodiments, heat exchange device 80 may be used to reduce the temperature in line 21. In embodiments, reactor 10 comprises catalyst slurry and a portion of slurry exits reactor 10 via line 16 and enters pump 5 via pump inlet line 21. Water may be removed from the portion of the reactor discharge in line 16 which is recycled to system 100, as known in the art. Condenser 80 may be used to remove water and reaction heat from fluid in line 21. After pumping, the pressurized slurry is mixed with synthesis gas via dispersible gas line 22 in high shear device 40, which serves to intimately mix the reactants and catalyst. In embodiments, the reactor 10 comprises an uncirculated bed (slurry, fixed, or fluidized) of catalyst, and line 21 comprises liquid catalyst-free hydrocarbon stream from reactor 10 discharge line 16.

The hydrocarbon product produced via the high shear system and process may comprise a mixture of hydrocarbons having a chain length of greater than 5 carbon atoms. The hydrocarbon liquid product may comprise a mixture of hydrocarbons having chain lengths from 5 to about 90 carbon atoms. In embodiments, the majority of the hydrocarbons in the hydrocarbon liquid product have a chain length in the range of from 5 to about 30 carbon atoms. Product upgrading may produce a wide range of commercial products, for example, gasoline, candle wax, and middle distillate fuels including diesel, naphtha, and kerosene.

Single Pass Operation. In the embodiment shown in FIG. 1, the system is configured for multiple pass operation, wherein a portion of the output from reactor 10 is directed back to HSD 40. In embodiments, single pass operation may be desired. In this case, product in line 16 (for fixed catalyst bed operation) or line 35 (for circulated catalyst operation) may be directed directly to further processing for recovery of desired products. In some embodiments it may be desirable to pass the contents of line 16, or a liquid fraction thereof, through HSD 40 during multiple passes, as described above. In this case, line 16 may be connected to line 21 as indicated in FIG. 1, such that at least a portion of the contents of line 16 is recycled from reactor 10 and pumped by pump 5 into line 13 and thence into HSD 40. Additional synthesis gas may be injected via line 22 into line 13, or it may be added directly into the high shear device (not shown).

Multiple High Shear Mixing Devices. In some embodiments, two or more high shear devices like HSD 40, or configured differently, are aligned in series, and are used to further enhance the reaction. Operation of serial high shear devices 40 may be in either batch or continuous mode. In some instances wherein catalyst is circulated through HSD 40 via line 21, the use of multiple high shear devices in series may permit fewer passes through the system to attain a desired product profile. For example, in embodiments, outlet dispersion 18 may be fed into a second high shear device. When multiple high shear devices 40 are operated in series, additional synthesis gas may be injected into the inlet feedstream of each high shear device. In some embodiments, multiple high shear devices 40 are operated in parallel, and the outlet dispersions therefrom are introduced into one or more reactor 10.

Downstream Processing. The product liquid hydrocarbons separated from product line 16 or separated and condensed out of gas line 17 may be hydrocracked. The hydrocracking may be catalytic hydrocracking, wherein the liquid hydrocarbon product is contacted with a hydrocracking catalyst. Suitable hydrocracking catalyst may comprise a metal selected from nickel, molybdenum, cobalt, tungsten, or a combination thereof. The catalyst metal may be supported on a support selected from silica, silica-alumina, and zeolites.

The increased surface area of the micrometer sized and/or submicrometer sized synthesis gas bubbles in the dispersion in line 18 produced within high shear device 40 results in faster and/or more complete reaction of hydrogen and carbon monoxide within reactor 10 and, if circulating catalyst operation is chosen, throughout high shear system 100. As mentioned hereinabove, potential benefits are the ability to operate reactor 10 at lower temperatures and pressures resulting in both operating and capital cost savings. Operation of Fischer-Tropsch reactor 10 at lower temperature may increase production of heavier hydrocarbons. The benefits of the present invention may include, but are not limited to, faster cycle times, increased throughput, reduced operating costs and/or reduced capital expense due to the possibility of designing a smaller Fischer-Tropsch reactor 10, operating reactor 10 at lower temperature and/or pressure of Fischer-Tropsch conversion, and/or the possible reduction in the amount of catalyst.

The application of enhanced mixing of the reactants by HSD 40 potentially permits enhanced Fischer-Tropsch conversion of synthesis gas. In some embodiments, the enhanced mixing potentiates an increase in throughput of the process stream. In some embodiments, the high shear mixing device is incorporated into an established process, thereby enabling an increase in production (i.e., greater throughput). Potential advantages of certain embodiments of the disclosed methods are reduced operating costs and increased production from an existing process. Certain embodiments of the disclosed processes additionally offer the advantage of reduced capital costs for the design of new processes. In embodiments, dispersing synthesis gas in liquid medium within high shear device 40 decreases the amount of unreacted synthesis gas in line 17.

Without wishing to be limited to a particular theory, it is believed that the level or degree of high shear mixing is sufficient to increase rates of mass transfer and also produces localized non-ideal conditions that enable reactions to occur that would not otherwise be expected to occur based on Gibbs free energy predictions. Localized non ideal conditions are believed to occur within the high shear device resulting in increased temperatures and pressures with the most significant increase believed to be in localized pressures. The increase in pressures and temperatures within the high shear device are instantaneous and localized and quickly revert back to bulk or average system conditions once exiting the high shear device. In some cases, the high shear mixing device induces cavitation of sufficient intensity to dissociate one or more of the reactants into free radicals, which may intensify a chemical reaction or allow a reaction to take place at less stringent conditions than might otherwise be required. Cavitation may also increase rates of transport processes by producing local turbulence and liquid micro-circulation (acoustic streaming). An overview of the application of cavitation phenomenon in chemical/physical processing applications is provided by Gogate et al., "Cavitation: A technology on the horizon," *Current Science* 91 (No. 1): 35-46 (2006). The high shear mixing device of certain embodiments of the present system and methods induces cavitation whereby hydrogen and carbon monoxide are dissociated into free radicals, which then react to produce product hydrocarbons.

The present methods and systems for conversion of synthesis gas into C2+ hydrocarbons via Fischer-Tropsch reactions employ an external high shear mechanical device to provide rapid contact and mixing of chemical ingredients in a controlled environment in the reactor/high shear device. The high shear device reduces the mass transfer limitations on the reaction and thus increases the overall reaction rate, and may allow substantial reaction of carbon monoxide and hydrogen under global operating conditions under which substantial reaction may not be expected to occur.

In embodiments, the system and process of the present disclosure provide for a higher selectivity to C5+ hydrocarbons than conventional Fischer-Tropsch processes comprising an absence of external high shear mixing. In embodiments, the degree of mixing in external high shear device 40 is varied to attain a desired outlet product profile. For Fischer-Tropsch conversion, lowering the operating temperature increases the production of heavier hydrocarbons. Because Fischer-Tropsch conversion is highly exothermic, it is often challenging to sufficiently cool Fischer-Tropsch reactor 10 such that longer chain hydrocarbons are produced. A certain amount of energy (i.e., thermal energy) is required to initiate and maintain the Fischer-Tropsch reaction. Typically, the operating temperature will be greater than about 180° C. In embodiments, the high shear Fischer-Tropsch process of the present disclosure allows operation of Fischer-Tropsch reactor 10 at a lower temperature whereby longer hydrocarbons are produced. In embodiments, the use of the present system and method for the Fischer-Tropsch production of C2+ hydrocarbons makes economically feasible the use of ruthenium and/or nickel catalysts on a commercial scale, by increasing contact with catalyst (by decreasing mass transfer resistance).

EXAMPLE

Example 1

Reaction of Carbon Monoxide and Hydrogen Via High Shear Mixing

The following example demonstrates the ability of the high shear device to facilitate the reaction between carbon monoxide and hydrogen in a synthesis gas conversion operation similar to what is commonly known as the Fischer Tropsch reaction where higher molecular weight hydrocarbons are synthesized.

An external IKA MK 2000 mill 40 (Registered trademark of IKA Works, Inc Wilmington, N.C.) was connected to a 10 liter stirred reactor. The apparatus used for the high shear process 400 for the reaction of CO and $H_2$ in this example is shown schematically in FIG. 3.

Figure 3:
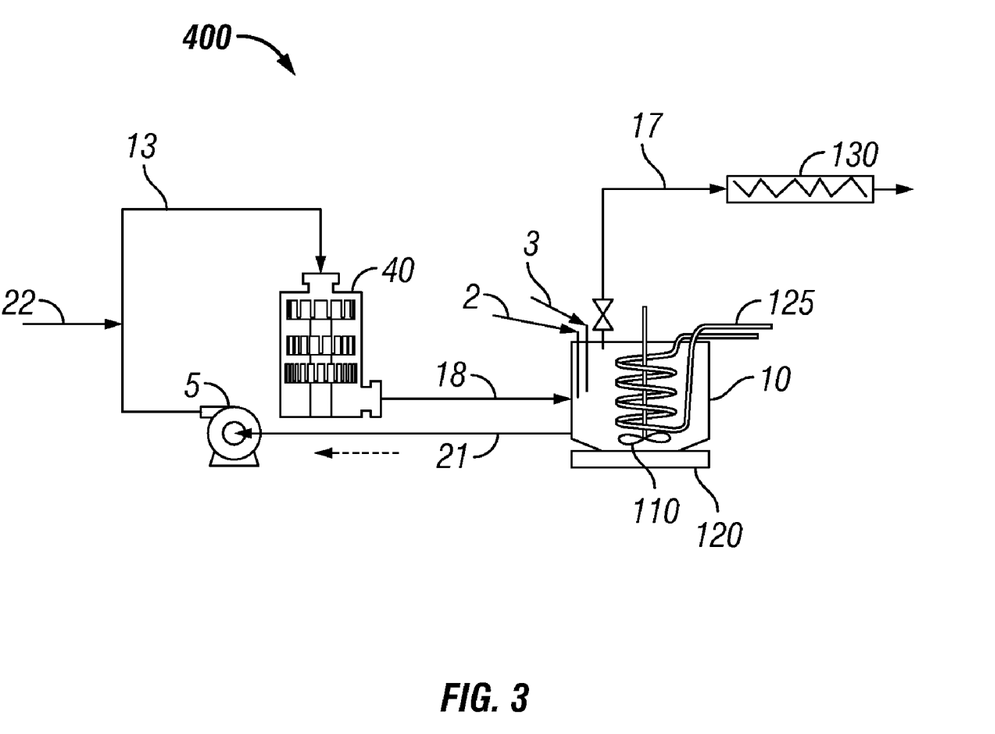
FIG. 3 is a process flow diagram of the apparatus used for the reaction of CO and H$_2$ in the experiment of Example 1.

The ten liter reactor 10 was formed by welding a section of ten inch diameter stainless steel pipe with a base plate and a head plate equipped with an agitator shaft and seal. Reactor 10 comprised internal paddle agitator 110 and a cooling coil 125. Reactor 10 also comprised pressure relief valve 17, discharge line 21, temperature probe 2 and pressure gauge 3. Heating mantle 120 was used to heat reactor 10 during start-up.

Reactor 10 was charged with eight liters of methanol (anhydrous, 99.8%) used as the carrier fluid and 5 grams of Triruthenium dodecacarbonyl (99%) catalyst, both supplied by Sigma-Aldrich Corporation, St. Louis, Mo.

Reactor 10 was sealed and purged with hydrogen. Circulation of catalyst slurry was initiated with heating. The recirculating pump 5 was a Roper Type 1 gear pump, Roper Pump Company (Commerce Ga.).

Dispersible gas stream comprising a mixed gas stream having an $H_2$:CO mole ratio of 2 was fed via dispersible inlet line 22 into the inlet of the IKA unit 40 at ambient temperature, and gas flow was regulated by means of a pressure relief valve (not shown) between the supply manifold (not shown) and the reactor IKA unit 40. The reaction was then carried out, maintaining the flow of mixed gases into the reactor. Pressures and temperatures are tabulated in Table 1.

TABLE 1

Pressures and Temperatures for Example 1

| Time (min) | Pump 5 Pressure (psig) | Pump 5 Pressure kPa | Reactor 10 Pressure (psig) | Reactor 10 Pressure kPa | Temperature (° C.) | Mixed Gas Flow (cc/min) |
|---|---|---|---|---|---|---|
| 0 | 80 | 552 | 23 | 159 | 61 | 50 |
| 60 | 122 | 841 | 70 | 531 | 77 | 81 |
| 120 | 162 | 1117 | 115 | 538 | 78 | 183 |
| 180 | 193 | 1331 | 154 | 545 | 79 | 200 |

Excess volatiles were vented through reactor 10 via condenser 130 which was cooled by water. Reactor 10 vent gas line 17 was used to vent excess hydrogen, CO and volatile reaction products. High shear device 40 was set to 60 Hz. After 180 min the mixed gas flow in line 22 was terminated, the pressure of reactor 10 was reduced, and high shear system 400 was allowed to cool to room temperature. A sample was drawn from reactor 10 and analyzed using gas chromatography. The results of the analysis are presented as Table 2.

TABLE 2

Gas Chromatograph Results from Example 1

| Component | Weight % |
|---|---|
| Methanol | 90.83 |
| n-hexane* | 4.63 |
| 3-Methylpentane | 1.64 |
| 2,4-Dimethylpentane | 0.85 |
| 2-Methylpentane | 0.66 |
| C 22 | 0.20 |
| msc | 1.19 |
| Total | 100.00 |

*Used as a rinsing agent

The results indicate that the system produced several higher molecular weight (C5+) hydrocarbon reaction products.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A method for forming C2+ hydrocarbons, the method comprising:
    forming a dispersion comprising synthesis gas bubbles dispersed in a liquid phase comprising hydrocarbons in a high shear device comprising at least one rotor and at least one stator separated by a shear gap width in the rage of about 0.001 inch to about 0.125 inch, and wherein the gas bubbles have a mean diameter of less than 400 nm, wherein the average bubble diameter of the synthesis gas bubbles is less than 1.0 µm;
    introducing the dispersion into a reactor; and
    removing a product stream comprising liquid hydrocarbons from the reactor.

2. The method of claim 1 wherein the gas bubbles have a mean diameter of no more than 100 nm.

3. The method of claim 1 wherein the synthesis gas is generated via natural gas reforming.

4. The method of claim 1 wherein the synthesis gas is generated via solids gasification.

5. The method of claim 4 wherein the solid is selected from the group consisting of coal, biomass, and bio-renewables.

6. The method of claim 1 wherein the reactor comprises Fischer-Tropsch catalyst and wherein the method further comprises circulating at least a portion of the product stream to the high shear device, wherein the high shear device comprises at least a first and second generator, and wherein a first shear rate provided by the first generator is greater than a second shear rate provide by the second generator.

7. The method of claim 6 wherein the at least a portion of the product stream circulated to the high shear device comprises Fischer-Tropsch catalyst, wherein the first generator comprises at least one rotor and at least one stator separated by a fixed shear gap width, and wherein the second generator comprises at least a second rotor and a second stator separated by a variable shear gap width.

8. The method of claim 6 wherein the at least a portion of the product stream circulated to the high shear device is substantially catalyst-free, wherein the first generator comprises a rotor and a stator separated by a clearance, and wherein the rotor and the stator each comprise at least one grooved surface.

9. The method of claim 1 wherein forming the dispersion comprises subjecting a mixture of the synthesis gas and the liquid phase to a shear rate of greater than about 20,000 s$^{-1}$, wherein the high shear device comprises a flow path, and wherein the shear rate varies with a longitudinal position along the flow path.

10. The method of claim 1 wherein the high shear device comprises at least one rotor, and wherein the at least one rotor is rotated at a tip speed of at least 22.9 m/s (4,500 ft/min) during formation of the dispersion.

11. The method of claim 1 wherein the high shear device produces a local pressure of at least about 1034.2 MPa (150,000 psi) at the tip of the at least one rotor, and wherein the reactor comprises a fixed bed reactor.

12. The method of claim 1 further comprising maintaining the gas bubbles in the dispersion for at least 15 minutes, wherein the energy expenditure of the high shear device is greater than 1000 W/m$^3$.

13. The method of claim 6 wherein the catalyst comprises a metal selected from the group consisting of iron, cobalt, and combinations thereof, wherein the first generator comprises a rotor and a stator separated by a clearance, and wherein the stator is fixedly coupled to a wall of the high shear device.

14. A method for converting synthesis gas to C2+ hydrocarbons, the method comprising:
    forming a fluid mixture comprising synthesis gas and a liquid comprising hydrocarbons;
    subjecting the fluid mixture to a shear rate greater than 20,000 s$^{-1}$ in a high shear device to produce a dispersion of carbon monoxide and hydrogen gas bubbles in a continuous phase of the liquid, wherein the high shear device comprises a first generator having at least one rotor and at least one stator separated by a shear gap width in the range of about 0.001 inch to about 0.125 inch;
    and introducing the dispersion into a Fischer-Tropsch reactor from which a reactor product is removed.

15. The method of claim 14 further comprising: removing a gas stream comprising unreacted synthesis gas and gaseous C2+ hydrocarbon products from a top portion of the reactor; and forming additional dispersion with at least a portion of the unreacted synthesis gas.

16. The method of claim 14 wherein the average bubble diameter of the hydrogen and carbon monoxide gas bubbles in the dispersion is less than about 1 μm.

17. The method of claim 14 wherein the dispersion is stable for at least about 15 minutes at atmospheric pressure.

18. The method of claim 14 wherein the high shear device comprises a second generator.

* * * * *